United States Patent [19]
Khan et al.

[11] 4,322,580
[45] Mar. 30, 1982

[54] CLOCK SELECTION CIRCUIT

[75] Inventors: Ashfaq R. Khan, Elmhurst; Max S. Macrander, Warrenville; Konstanty E. Krylow, Chicago, all of Ill.

[73] Assignee: GTE Automatic Electric Labs Inc., Northlake, Ill.

[21] Appl. No.: 182,871

[22] Filed: Sep. 2, 1980

[51] Int. Cl.³ ............................. G06F 1/04; H04Q 3/54
[52] U.S. Cl. ................................ 179/18 EE; 364/900; 371/8
[58] Field of Search .................. 179/18 EE; 364/200, 364/900; 371/8; 307/441, 442, 480, 219

[56] References Cited

U.S. PATENT DOCUMENTS 3,553,369  1/1971  Flohrer ................... 179/18 EE X
3,803,568  4/1974  Higaside ............................. 371/8

Primary Examiner—Thomas W. Brown
Attorney, Agent, or Firm—Robert J. Black; Gregory G. Hendricks

[57] ABSTRACT

A circuit which selects and enables one of a plurality of clock circuits. Logic circuitry is used to detect failure of an on line clock circuit, scan a plurality of available clock circuits in a predetermined sequence and place the next available properly operating clock circuit on line.

8 Claims, 1 Drawing Figure

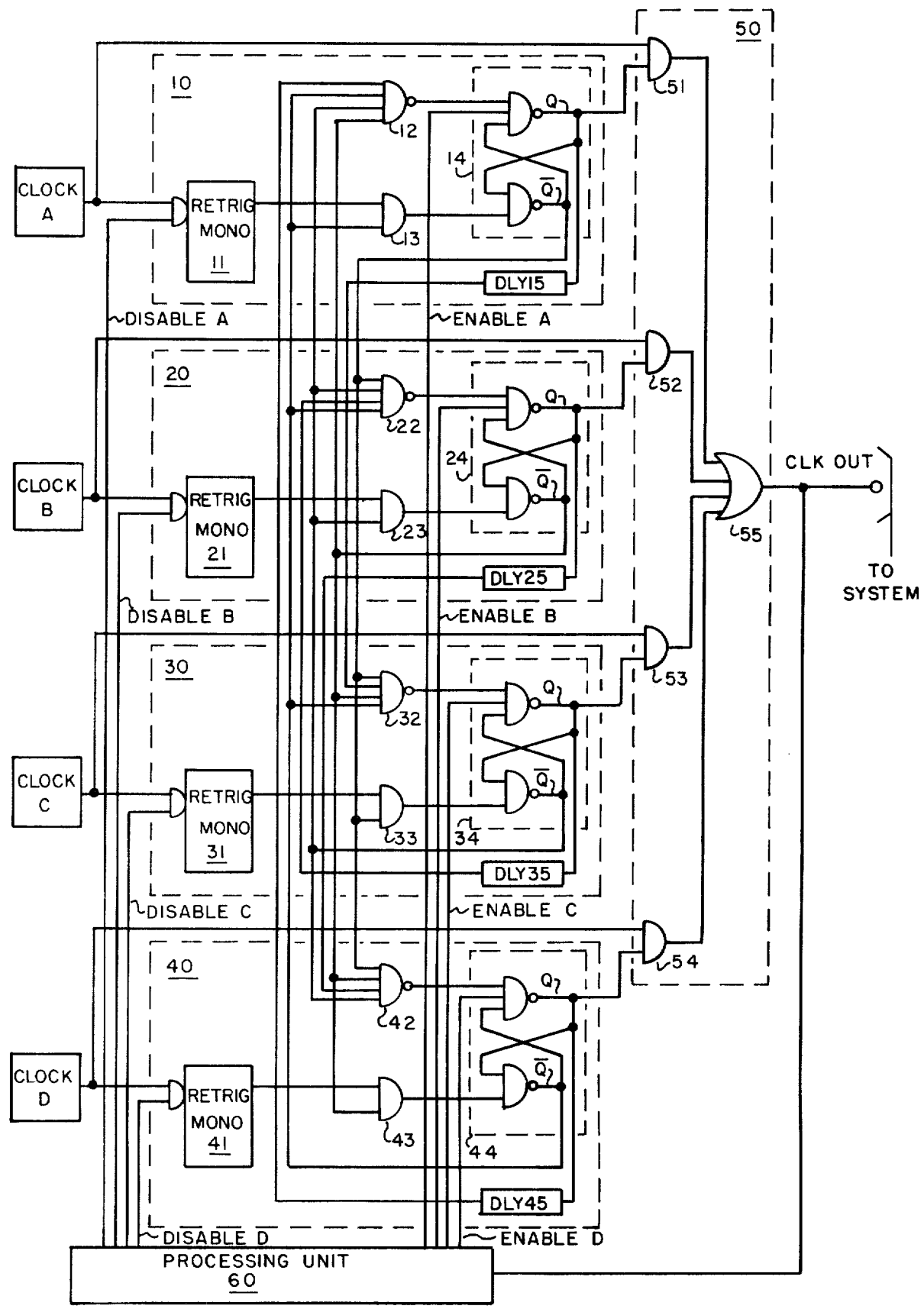

CLOCK SELECTION CIRCUIT

BACKGROUND OF THE INVENTION (1) Field of the Invention

The present invention relates to telephone switching systems and more particularly to a clock selection circuit for use in a telephone switching system having a plurality of clock circuits.

(2) Description of the Prior Art

Telephone switching systems have been equipped with redundant clock circuits to prevent interruptions in service due to failure of a clock circuit. These telephone systems typically include a pair of clock circuits arranged in an active-standby manner. Such an arrangement is based on the assumption that only one fault can exist at one time and therefore two clock circuits are deemed sufficient. Only minimal logic circuitry was needed to control selection of active and standby clock circuits since it need only detect failure of the active clock circuit and then switch to the standby clock circuit. However such systems are subject to interruptions in service should there be a failure in the standby clock circuit which is forced on line upon detection of a failure in the active clock circuit.

In order to provide increased reliability additional clock circuits are required. More sophisticated clock selection circuitry must also be provided to insure that only a properly operating standby clock circuit is switched on line upon detection of a failure in the active clock circuit.

Accordingly, it is the object of the present invention to provide a highly reliable clock selection circuit capable of selecting a properly functioning clock circuit from a plurality of available clock circuits, upon detection of a failure in the on-line clock circuit.

SUMMARY OF THE INVENTION

The present invention is a circuit which provides for replacement of a faulty on-line clock circuit with a validly operating standby clock circuit selected from a plurality of standby clock circuits. This circuit operates to provide clock pulses to the associated telephone switching system and could typically be connected to four clock circuits. The clock selection circuit includes a corresponding number of monitor and enable circuits each associated with one of the clock circuits. These four monitor and enable circuits are then connected to a gating circuit which is connected to the telephone switching system. Each monitor and enable circuit is further connected to a processing unit, included in the telephone switching system, which can override the selection sequence.

Each monitor and enable circuit includes a retriggerable monostable multivibrator connected between an associated clock circuit and an associated latch circuit. The reset inputs of each monitor and enable circuit include the associated clock lead and the reset output from the monitor and enable circuit previously occurring in the predetermined selection pattern. The set inputs of the monitor and enable circuit include the reset outputs of all other monitor and enable circuits and the set output of the monitor and enable circuit occurring previously in the predetermined selection pattern. The set output of each latch circuit is further connected to a gating circuit which enables a clock output signal. Each multivibrator and latch circuit is further connected to the processing unit.

The four monitor and enable circuits are arranged in two copies with circuits A and B in copy 1 and circuits C and D in copy 2. The sequence of switching is from clock circuit A to clock circuit C to clock circuit B to clock circuit D and back to clock circuit A. This provides the flexibility to routine one copy while the other copy is the master and running the system, e.g., if clock circuit A is active, then clock circuits C and D can be routined without disturbing system operation.

The processing unit can initialize the monitor and enable circuits such that clock circuit A is active and clock circuits B, C and D are standby. Upon detection of a failure in the active clock circuit the clock selection circuit will place the next validly operating standby clock on line per a predetermined selection pattern determined by the connection arrangement between the monitor and enable circuits. For example, if clock circuit C was active and experienced a failure, and clock circuit B was also operating improperly, clock circuit D would be placed on line if it was operating properly. However, the processing unit has the capability of overriding the hardware selection sequence and select a desired configuration at any time.

DESCRIPTION OF THE DRAWING

The single FIGURE of the accompanying drawing is a logic diagram of a clock selection circuit in accordance with the present invention.

DESCRIPTION OF THE PREFERRED EMBODIMENT

Referring now to accompanying drawing the clock selection circuit of the present invention is shown. Monitor and enable circuits 10, 20, 30 and 40 are shown connected to clock circuits A, B, C and D. These monitor and enable circuits are further connected to a processing unit and to the remainder of an associated telephone switching system via gate circuit 50. Monitor and enable circuit 10 includes retriggerable monostable multivibrator 11 connected between clock circuit A and reset gate 13. The reset output of latch 44 is also connected to reset gate 13 which is connected to the reset input of latch 14. Set gate 12 is shown connected to the set input of latch 14. The inputs to set gate 12 are connected to the reset outputs of the remaining latch circuits and to the set output of latch 44 via delay circuit 45. Monitor and enable circuit 10 further includes delay circuit 15 connected between the set output of latch 14 and associated monitor and enable circuit 30.

The remaining monitor and enable circuits are arranged similarily with retriggerable monostable multivibrators, latch circuits and set and reset gate circuits.

The set outputs of each latch circuit are further connected to an associated clock gate circuit (51, 52, 53, 54). These clock gate circuits are also connected to an associated clock circuit. The outputs of these clock gate circuits are connected to OR gate 55 which provides the clock output signal to processing unit 60 and to the remainder of the associated telephone switching system.

Processing unit 60 includes enable leads connected to each latch circuit and disable leads connected to each retriggerable monostable multivibrator.

The clock selection circuit of the present invention operates to disable a failed clock circuit, and enable a properly operating standby clock circuit by testing and selecting clock circuits in a predetermined sequence.

The four clock circuits are arranged into copies 1 and 2 with clock circuits A and B in copy 1 and clock circuits C and D in copy 2. The sequence of switching is from clock circuit A to C to B to D to A.

To implement this sequencing pattern a set gate input of each latch circuit is connected to the set output of the monitor and enable circuit immediately preceding in the selection sequence via an associated delay circuit. Other inputs of this set gate are connected to the reset outputs of all other monitor and enable circuits. For example, the inputs to set gate 12 are connected to the reset outputs of latches 24, 34 and 44 associated with clock circuits B, C and D and also to the set output of latch 44 via delay circuit 45, both of which are associated with clock circuit D which is selected immediately before clock circuit A in the selection sequence. An input to the reset gate of each monitor and enable circuit is further connected to the reset output of the latch associated with the monitor and enable circuit immediately preceding in the selection sequence; for example, reset gate 13 associated with clock A includes an input connected to the reset output of the latch circuit 44 which is associated with clock circuit D.

Processing unit 60 initializes the latches in the clock selection circuit via the enable and disable leads. A typical initialization arrangement would be to enable clock circuit A and disable clock circuits B, C and D. To do this processing unit 60 generates a logic 0 signal on the enable lead connected to latch circuit 14 and logic 0 signals on the disable leads connected to multivibrators 21, 31 and 41. These processing unit signals would then force latch 14 to set and latches 24, 34 and 44 to reset, thus enabling clock circuit A to generate signals on the clock out lead.

Monostable multivibrators 11, 21, 31 and 41 generate a 200 nanosecond timing pulse. However, since they are retriggerable, this 200 nanosecond pulse begins every time a pulse appears at its input. Clock circuits A, B, C and D typically operate at 12 MHz which results in an 80 nanosecond period. Consequently the 200 nanosecond monostable pulse is retriggered every 80 nanoseconds and thus generate a logic 1 signal as long as the clock pulses continue to appear more frequently then the timing period of the associated multivibrator. If a clock circuit fails, the clock pulses disappear and the associated retriggerable multivibrator will time out after 200 nanoseconds. This will result in a logic 0 signal.

In the event of a failure of clock circuit A the clock selection circuit would select the next properly operating clock circuit in the clock selection sequence. Clock circuit C is the next clock circuit to be selected according to the predetermined sequence if clock circuit C is operating properly.

Assuming clock circuit C is operating properly, it will cause a logic 1 signal to be applied to the first input of gate 33. When clock circuit A failed, retriggerable monostable multivibrator 11 generated a logic 0 signal which was detected on the first input to gate 13. This logic 0 signal was gated by gate 13 to latch 14 and caused it to reset, thereby generating a logic 1 signal on the reset output of latch 14. Consequently a logic 1 signal appears at the second input of gate 33, thereby causing a logic 1 signal to appear at the reset input of latch 34. The inputs to set gate 32 are connected to the outputs of latches 14, 24 and 44, all of which are in the reset state and therefore present logic 1 signal on these leads. Set gate 32 also includes a connection to the set output of latch 14 via delay circuit 15.

Immediately upon detection of the failure of clock circuit A, the reset output of latch circuit 14 switches to a logic 1 signal and set output of latch 14 switches to a logic 0 signal. However, this logic 0 signal does not appear at the input to gate 32 until the time delay of delay circuit 15 has elapsed. Therefore a logic 1 signal remains on this lead until delay circuit 15 times out. The delay timing is selected to be long enough to allow latch 34 to set. At the expiration of this delay period a logic 0 signal appears at this input to gate 32 which causes a logic 1 signal to appear at the input to set gate 34. However, this signal has no impact since latch circuit 34 had previously been set.

In the event that clock circuit C had also failed the clock selection circuit would not enable clock circuit C but would enable the next properly operating clock circuit in the clock selection sequence. If clock circuit C had failed, a logic 0 signal would appear at the input to reset gate 33, thus holding the reset output of latch 34 at a logic 1 signal. This would prevent latch circuit 34 from setting and there would be a logic 1 signal on both the set and reset outputs. Under these conditions the logic 1 signals from both the set and reset outputs of latch 34 would appear as input signals to set gate 22. Logic 1 signals would also appear at the remaining two inputs to set gate 22 since they are connected to the reset outputs of latch 14 which was reset upon failure of clock circuit A, and the reset output of latch circuit 44 which was previously reset. Therefore, if clock circuit B is properly operating a logic 1 signal appears as a first input to reset gate 23 along with a logic 1 signal from the reset output of latch circuit 34. This causes a logic 1 signal to appear at the reset input of latch 24. Set gate 22 then generates a logic 0 signal since all of its inputs are at logic level 1. This causes latch circuit 24 to set, thus enabling clock circuit B via gates 52 and 55. The selection process would operate similarily if clock circuit B had also failed. In that event clock circuit D would be enabled if it was operating properly.

The present invention provides for a predetermined clock selection sequence in which the next available, properly operating clock is placed on line upon detection of a failed clock circuit. There is also a software override feature which allows the processing unit to override the hardware selection process at any time.

It will be obvious to those skilled in the art that numerous modifications of the present invention can be made without departing from the spirit of the invention which shall be limited only by the scope of claims appended hereto. For example, more or less clock circuits can be connected to the clock selection circuit by implementing a corresponding number of monitor and enable circuits.

What is claimed is:

1. A clock selection circuit for use in a telephone switching system including a plurality of clock circuits, each operated to generate a clock signal, and a processing unit, operated to generate a plurality of enable and disable signals, said selection circuit comprising:
a plurality of selection means each including first, second and third outputs, each of said selection means connected to an associated one of said clock circuits, to said third output of all other selection means and to said second output of an associated one of said selection means, each operable to generate signals on said first, second and said third outputs, each operated in response to a clock signal from an associated clock circuit, said third output signal from all other selection means and said second output signal from said associated one other selection means, to generate said first output signal, each of said selection means further operated in response to an absence of said clock signal from said associated clock circuit to generate said third output signal; and gating means connected to said plurality of selection means and to said plurality of clock circuits, operated in response to each of said first output signals and a clock signal from an associated clock circuit to generate a clock-out signal.

2. A clock selection circuit as claimed in claim 1, wherein: said selection means are further operated in response to an associated one of said enable signals to generate said first and second output signals.

3. A clock selection circuit as claimed in claim 1, wherein: said selection means are further operated in response to an associated one of said disable signals to generate said third output signal.

4. A clock selection circuit as claimed in claim 1, wherein said gating means comprise a plurality of clock enable gates each connected to an associated clock circuit and an associated selection means, operated in response to said first output signal and said clock signal to generate a gated clock signal; and an output gate connected to said plurality of clock enable gates, operated in response to said each gated clock signal to generate said clock-out signal.

5. A clock selection circuit as claimed in claim 1, wherein said clock signal includes periodically occurring clock pulses, each of said selection means comprises: detection means connected to an associated clock circuit operated in response to clock pulses occurring more frequently than a predetermined rate, to generate a clock detected signal, and further operated in response to clock pulses occurring less frequently than said predetermined rate to generate a clock failure signal.

6. A clock selection circuit as claimed in claim 5, wherein said detection means comprises a retriggerable monostable multivibrator.

7. A clock selection circuit as claimed in claim 5, wherein each of said selection means comprises:

first gate means connected to said third output of all other selection means and said second output of an associated selection means, operated in response to said second and third output signals to generate a first trigger signal;

second gate means connected to an associated detection means and said third output of said associated one other selection means, operated to generate a second trigger signal; and a latch circuit connected to said first and second gate means, operated in response to said first trigger signal to generate said first and second output signals and further operated in response to said second trigger signal to generate said third output signal.

8. A clock selection circuit as claimed in claim 1, wherein: said second output of each of said selection means includes a delay circuit, operated in response to said first output signal to generate said second output signal, by delaying the appearance of said first output signal at said second output.

* * * * *